(12) United States Patent
Ellner

(10) Patent No.: US 8,782,271 B1
(45) Date of Patent: Jul. 15, 2014

(54) VIDEO MIXING USING VIDEO SPEECH DETECTION

(75) Inventor: Lars Henrik Ellner, San Francisco, CA (US)

(73) Assignee: Google, Inc., Mountain View, CA (US)

( * ) Notice: Subject to any disclaimer, the term of this patent is extended or adjusted under 35 U.S.C. 154(b) by 256 days.

(21) Appl. No.: 13/423,341

(22) Filed: Mar. 19, 2012

(51) Int. Cl.
G06F 15/16 (2006.01)
H04L 29/06 (2006.01)

(52) U.S. Cl.
CPC ............................... *H04L 29/06176* (2013.01)
USPC ........................................................ 709/231

(58) Field of Classification Search
CPC .................. H04L 29/06027; H04L 29/04414; H04L 12/1818; H04L 12/1813; H04L 29/06176; H04L 29/06414
USPC ........................................................ 709/231
See application file for complete search history.

(56) References Cited

U.S. PATENT DOCUMENTS

| | | | |
|---|---|---|---|
| 6,243,683 B1 | 6/2001 | Peters | |
| 6,816,836 B2 | 11/2004 | Basu et al. | |
| 7,007,235 B1 | 2/2006 | Hussein et al. | |
| 7,219,062 B2 | 5/2007 | Colmenarez et al. | |
| 7,664,246 B2 | 2/2010 | Krantz et al. | |
| 7,684,982 B2 | 3/2010 | Taneda | |
| 7,822,607 B2 | 10/2010 | Aoki et al. | |
| 7,860,718 B2 | 12/2010 | Lee et al. | |
| 7,864,210 B2 | 1/2011 | Kennedy | |
| 8,019,175 B2 | 9/2011 | Lee et al. | |
| 2002/0176604 A1 | 11/2002 | Shekhar et al. | |
| 2004/0172252 A1 | 9/2004 | Aoki et al. | |
| 2004/0172255 A1 | 9/2004 | Aoki et al. | |
| 2006/0153217 A1* | 7/2006 | Chu et al. | 370/412 |
| 2006/0215752 A1 | 9/2006 | Lee et al. | |
| 2006/0247927 A1 | 11/2006 | Robbins et al. | |
| 2007/0081522 A1* | 4/2007 | Apelbaum | 370/352 |
| 2007/0285505 A1 | 12/2007 | Korneliussen | |
| 2009/0322854 A1 | 12/2009 | Ellner | |
| 2010/0149301 A1* | 6/2010 | Lee et al. | 348/14.08 |
| 2010/0220172 A1 | 9/2010 | Michaelis | |
| 2011/0093273 A1 | 4/2011 | Lee et al. | |
| 2011/0131144 A1 | 6/2011 | Ashour et al. | |
| 2012/0013705 A1* | 1/2012 | Taylor et al. | 348/14.08 |
| 2012/0206562 A1* | 8/2012 | Yang et al. | 348/14.09 |

* cited by examiner

*Primary Examiner* — Krisna Lim
(74) *Attorney, Agent, or Firm* — Young, Basile, Hanlon & MacFarlane, P.C.

(57) ABSTRACT

A method for video conferencing includes receiving, at one or more computers from at least some remote clients from a plurality of remote clients, information representing a plurality of media frames. The method also includes receiving, at the one or more computers from at least some of the plurality of remote clients, a plurality of video-based speech activity signals each associated with a respective media frame from the plurality of media frames. The method further includes selecting, at the one or more computers, at least some media frames from the plurality of media frames based on the video-based speech activity signals, decoding the selected media frames, generating a mixed media stream by combining the decoded media frames, transmitting, from the one or more computers to at least some remote clients from the plurality of remote clients, the mixed media stream.

26 Claims, 7 Drawing Sheets

VIDEO MIXING USING VIDEO SPEECH DETECTION

BACKGROUND

Video conferencing systems that mix and/or relay multiple incoming media streams are known. In some video conferencing systems that are designed to handle video conferencing sessions involving multiple participants, a server receives incoming media streams from some or all of the conference participants, and determines which of the incoming media streams are to be mixed and/or relayed back to the conference participants as outgoing media streams. In some situations, the video conferencing server can receive a large number of incoming media streams. There is usually only a need to mix and/or relay a subset of the incoming media streams. Determining which media streams to mix and/or relay can, in some situations, require a significant amount of processing resources.

One approach involves determining, at the video conferencing server, which of the incoming media streams represent conference participants that are speaking. Commonly, this determination is made in the signal domain using, for example, voice activity detection (VAD). This requires decoding each of the incoming media streams at the video conferencing server to determine which of the incoming media streams represent conference participants that are speaking.

SUMMARY

The disclosed embodiments relate to video conference views that are defined by mixing and/or relaying media streams based on video speech detection.

One aspect of the disclosed embodiments is a method for video conferencing. The method includes receiving, at one or more computers from at least some remote clients from a plurality of remote clients, information representing a plurality of media frames. The method also includes receiving, at the one or more computers from at least some of the plurality of remote clients, a plurality of video-based speech activity signals each associated with a respective media frame from the plurality of media frames. The method further includes selecting, at the one or more computers, at least some media frames from the plurality of media frames based on the video-based speech activity signals, decoding the selected media frames, generating a mixed media stream by combining the decoded media frames, transmitting, from the one or more computers to at least some remote clients from the plurality of remote clients, the mixed media stream.

Another aspect of the disclosed embodiments is a method for video conferencing. The method includes receiving, at one or more computers from at least some remote clients from a plurality of remote clients, information representing a plurality of media frames. The method also includes receiving, at the one or more computers from at least some of the plurality of remote clients, a plurality of video-based speech activity signals each associated with a respective media frame from the plurality of media frames. The method further includes selecting, at the one or more computers, at least some media frames from the plurality of media frames based on the video-based speech activity signals, and transmitting, from the one or more computers to at least some remote clients from the plurality of remote clients, the selected media frames without decoding the selected media frames at the one or more computers.

Another aspect of the disclosed embodiments is a video conferencing apparatus that includes one or more computers. The one or more computers are configured to receive, from at least some remote clients from a plurality of remote clients, information representing a plurality of media frames. The one or more computers are also configured to receive, from at least some of the plurality of remote clients, a plurality of video-based speech activity signals each associated with a respective media frame from the plurality of media frames. The one or more computers are further configured to select, at the one or more computers, at least some media frames from the plurality of media frames based on the video-based speech activity signals, decode the selected media frames, generate a mixed media stream by combining the decoded media frames, and transmit, from the one or more computers to at least some remote clients from the plurality of remote clients, the mixed media stream.

Another aspect of the disclosed embodiments is non-transitory computer readable medium including program instructions executable by one or more processors that, when executed, cause the one or more processors to perform operations. The operations include receiving, at one or more computers from at least some remote clients from a plurality of remote clients, information representing a plurality of media frames. The operations also include receiving, at the one or more computers from at least some of the plurality of remote clients, a plurality of video-based speech activity signals each associated with a respective media frame from the plurality of media frames. The operations further include selecting, at the one or more computers, at least some media frames from the plurality of media frames based on the video-based speech activity signals, decoding the selected media frames, generating a mixed media stream by combining the decoded media frames, transmitting, from the one or more computers to at least some remote clients from the plurality of remote clients, the mixed media stream.

BRIEF DESCRIPTION OF THE DRAWINGS

The description herein makes reference to the accompanying drawings wherein like reference numerals refer to like parts throughout the several views, and wherein.

DETAILED DESCRIPTION

Decoding a media frame at a video conferencing server to determine whether it is to be mixed and/or relayed can cause processing resources to be expended on frames that are not mixed and/or relayed, and potentially imposes limits on the number of video conference participants that the video conferencing server can support.

Also, systems that base mixing and/or relay decisions on VAD are susceptible to falsely detecting a speaking state for a conference participant in situations where, for example, background noise is present in an audio signal. Some implementations disclosed herein are directed to systems in which a decision as to whether a media frame from a remote client is to be mixed and/or relayed to other remote clients is made based on a video-based speech activity signal that is generated at the remote client based on a video component of the media frame.

Figure 1:
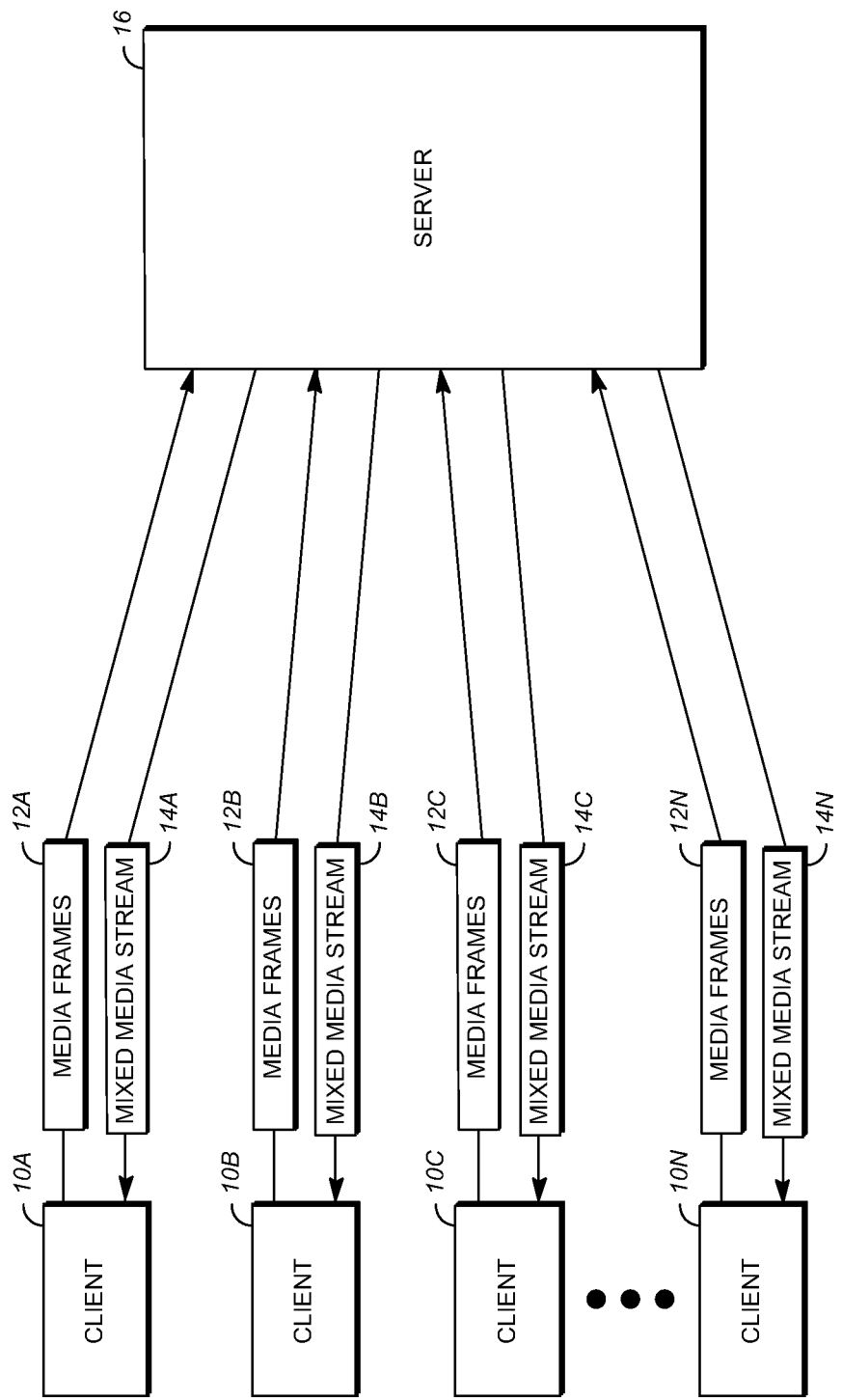
FIG. 1 is block diagram showing an example of system architecture for implementation of a video conferencing system.

FIG. 1 shows an example of an environment for implementing video mixing using video speech detection. As shown in FIG. 1, a plurality of clients 10A-10N send information representing a plurality of media frames 12A-12N to a server 16 and receive mixed media streams 14A-14N from the server 16. Each of the computers and other systems can be one or more computing devices executing software operable to perform the functionality described herein. The clients 10A-10N and the server 16 can be in communication using, for example, a network or multiple networks of any kind that allow for transmission of data and/or signals between each of the clients 10A-10N and the server 16.

The clients 10A-10N can be computing devices that are utilized by participants (e.g., users, individuals, etc.) in a video communication session, which is sometimes referred to herein as a "video conference." For example, in a given time period, the server 16 can receive the media frames 12A-12N from some or all of the clients 10A-10N that are participating in the session. As will be explained further herein, the media frames 12A-12N include a video component and, in some implementations, can also include an audio component. The audio and video components can be encoded separately or together.

The server 16 can mix (e.g., combine) some or all of the media frames 12A-12N to send back to the clients 10A-10N in the form of the mixed media streams 14A-14N. The decision (sometimes be referred to herein as the "mixing decision") as to which of the media frames 12A-12N are to be included in the mixed media streams 14A-14N can depend on one or more factors, and will be explained in detail herein. Each of the mixed media streams 14A-14N includes a video component and, in some implementations, can also include an audio component. Each of the mixed media streams 14A-14N can include representations corresponding to some or all of the media frames 12A-12N. As one example, each of the mixed media streams 12A-12N, when rendered by a respective one of the clients 10A-10N, can present a video showing a view of two or more participants of the video conference, for example, a mixed view could show video corresponding to four participants where the videos are arranged in a grid style view.

The mixed media streams 14A-14N may vary between the clients. For example, a particular client's audio and/or video might not be included in the mixed media stream that is transmitted to it, but might be mixed in the media streams that are sent to other clients. Additionally, the media frames 12A-12N sent by the clients 10A-10N can be relayed by the server 16 to the other clients 10A-10N without processing, and the mixing decision can be made at the client 10A-10N level.

Figure 2:
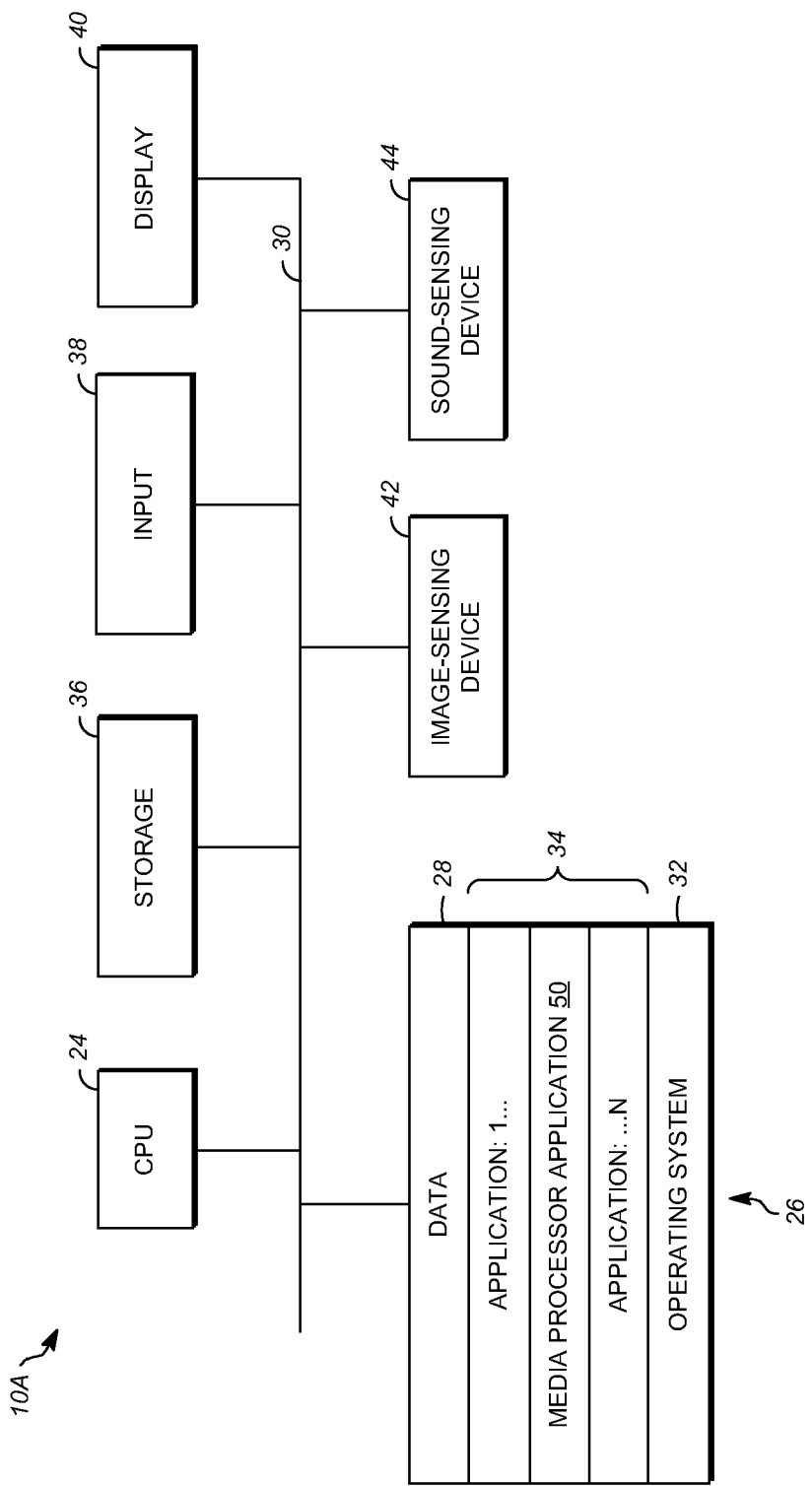
FIG. 2 is a block diagram showing an example of a client.

FIG. 2 is a block diagram of an example of a computing device that can be utilized as the client 10A, which is shown as representative of the clients 10A-10N. The client 10A can be in the form of a computing system including multiple computing devices, or in the form of a single computing device, for example, a mobile phone, a tablet computer, a laptop computer, a notebook computer, a desktop computer, and the like.

The CPU 24 in the client 10A can be a conventional central processing unit. Alternatively, the CPU 24 can be any other type of device, or multiple devices, capable of manipulating or processing information now-existing or hereafter developed. Although the disclosed examples can be practiced with a single processor as shown, i.e. CPU 24, advantages in speed and efficiency can be achieved using more than one processor.

The client 10A can include memory 26, such as a random access memory device (RAM). Any other suitable type of storage device can be used as the memory 26. The memory 26 can include code and data 28 that is accessed by the CPU 24 using a bus 30. The memory 26 can further include an operating system 32 and application programs 34. The application programs 34 can include programs that permit the CPU 24 to perform the methods described here. For example, the application programs 34 can include applications 1 through N which further include a media processor application 50, which will be described in detail herein.

A storage device 36 can be optionally provided in the form of any suitable computer readable medium, such as a hard disc drive, a memory device, a flash drive or an optical drive. One or more input devices 38, such as a keyboard, a mouse, or a gesture sensitive input device, receive user inputs and can output signals or data indicative of the user inputs to the CPU 24. One or more output devices can be provided, such as a display device 40. The display device 40 can be a liquid crystal display (LCD), a cathode-ray tube (CRT), or any other device 40 capable of allowing output to be presented to the user, for example, in response to receiving an audio, video, or other multimedia signal.

The client 10A can also include or be in communication with an image-sensing device 42, for example a camera, or any other image-sensing device 42 now existing or hereafter developed that can sense the image of a device user operating the client 10A. The image-sensing device 42 can be positioned such that it is directed toward a device user that is operating the client 10A. For example, the position and optical axis of the image-sensing device 42 can be configured such that the field of vision includes an area that is directly adjacent to the display device 40, from which the display device 40 is visible. The image-sensing device 42 can be configured to receive images, for example, of the face of a device user while the device user is operating the client 10A.

The client 10A can also include or be in communication with a sound-sensing device 44, for example a microphone, or any other sound-sensing device now existing or hereafter developed that can sense the sounds made by the device user operating the client 10A. The sound-sensing device 44 can be positioned such that it is directed toward the device user operating the client 10A. The sound-sensing device 44 can be configured to receive sounds, for example, speech or other utterances made by the device user while the device user operates the client 10A.

Although FIG. 2 depicts the CPU 24 and the memory 26 of the client 10A as being integrated into a single unit, other configurations can be utilized. The operations of the CPU 24 can be distributed across multiple machines (each machine having one or more of processors) which can be coupled directly or across a local area or other network. The memory 26 can be distributed across multiple machines such as network-based memory or memory in multiple machines performing the operations of the client 10A. Although depicted here as a single bus, the bus 30 of the client 10A can be composed of multiple buses. Further, the storage device 36 can be directly coupled to the other components of the client 10A or can be accessed via a network and can comprise a single integrated unit such as a memory card or multiple units such as multiple memory cards. The client 10A can thus be implemented in a wide variety of configurations.

Figure 3:
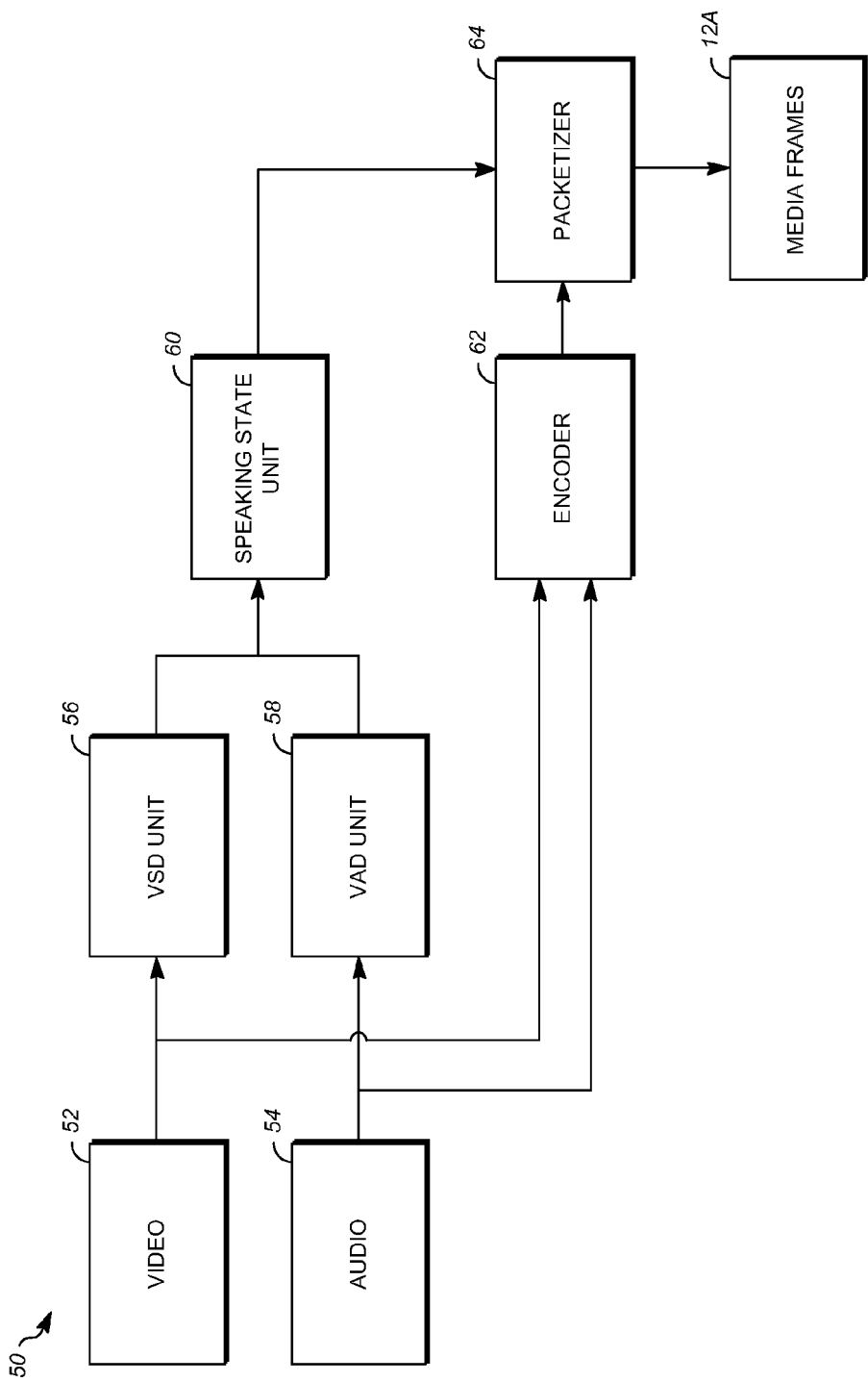
FIG. 3 is a block diagram showing a media processor application of the client.

FIG. 3 shows an example of the media processor application 50. The media processor application 50 can be implemented in the form of computer executable software instructions that can be executed at, for example, the CPU 24 of the client 10A. A video stream 52 can be received as input from, for example, the image-sensing device 42. An audio stream 54 can be received as input from, for example, the sound-sensing device 44.

The video stream 52 is input to a video speech detection (VSD) unit 56. The VSD unit 56 is operable to process the video stream 52 and determine a video speaking state, which is also referred to herein as a VSD state. The video speaking state represents a likelihood that a participant in the video stream 52 is currently speaking, based on analysis of the video stream 52. The video speaking state can be expressed as a probability, a numeric value set with or without respect to a predetermined maximum value, or a Boolean value. In one implementation, the video speaking state is based on a probability that a participant in the video stream 52 is speaking, and is expressed as a Boolean value, which can be set by comparing the probability to a threshold, or by heuristic analysis methods.

The video speaking state can be determined by analyzing motion of one or more of the participants captured in the video stream 52. In one example, facial landmarks, such as lips, can be recognized, and the video speaking state can be determined on the basis the extent and patterns of lip motion. In another example, hand motion can be recognized by the VSD unit 56, to set the speaking state when a gestural language, such as American Sign Language, is being used. Other methods and algorithms, now known or later developed can be used as a basis for determining the video speaking state.

In some implementations, the media processor application 50 includes a voice activity detection (VAD) unit 58. The audio stream 54 can be provided to the VAD unit 58 as an input. The VAD unit 58 is operable to process the audio stream 54 and determine an audio speaking state, which is also referred to herein as a VAD state. The audio speaking state represents whether a participant whose audio is captured in the audio stream 54 is currently speaking. The audio speaking state can, for example, be determined based on a signal level of the audio stream 54. As one example, the audio speaking state can be a value representing the signal level of the audio stream 54. As another example, the audio speaking state can be a Boolean value that is set by comparing the signal level of the audio stream 54 to a threshold. Other methods now know or later developed can be used as a basis for determining the audio speaking state.

The media processor application 50 can include a speaking state unit 60 that is operable to output a speech activity signal that is indicative of whether the participant is currently speaking, such as a probability, a numeric value, or a Boolean value. The speech activity signal can be a video-based speech activity signal, which is generated at least in part on a video component, such as the video stream 52. A video-based speech activity signal can indicate the presence of at least one visible feature in a video component that is indicative of a speaking state for a participant, as previously described in connection with the video speaking state.

The speaking state unit 60 can receive the video speaking state as an input, and, in some implementations, can also receive the audio speaking state as an input. In some examples the speech activity signal is set to a positive value, indicative of a speaking participant, when both the video speaking state and the audio speaking state indicate that the participant is speaking, but is set to a negative value when either of the video speaking state or the audio speaking state indicates that the participant is not speaking. In some examples, the speech activity signal can be set to a positive value if the video speaking state indicates that the participant is speaking but the audio speaking state indicates that the participant is not speaking. In some examples, the speaking state unit 60 can weigh the video speaking state and audio speaking state according to the accuracy of the VSD unit 56 and VAD unit 58.

The video stream 52 and, in some implementations, the audio stream 54, can be provided to an encoder 62 as input. The video stream 52 and the audio stream 54 can be encoded and output from the encoder 62 as a bit stream that is provided to a packetizer 64 as an input.

The packetizer 64 is operable to output the media frames 12A-12N. As inputs, the packetizer 64 receives encoded versions of the video stream 52 and the audio stream 54 from the encoder 62, and also receives the speech activity signal that is output by the speaking state unit 60. The media frames 12A-12N are defined such that they include the speech activity signal corresponding to portions of the video stream 52 and the audio stream 54 that are represented therein, which can be incorporated in the media frames 12A-12N as video components and audio components, respectively, of the media frames 12A-12N. The media frames 12A-12N can be in the form of packets. The packets can include video packets and audio packets. In one implementation the packets are Real-Time Transport Protocol (RTP) packets that include at least information representing the video stream 52 as a payload. The RTP packets can also include the speech activity signal as part of the header of the RTP packets, such as in an RTP header extension.

Figure 4:
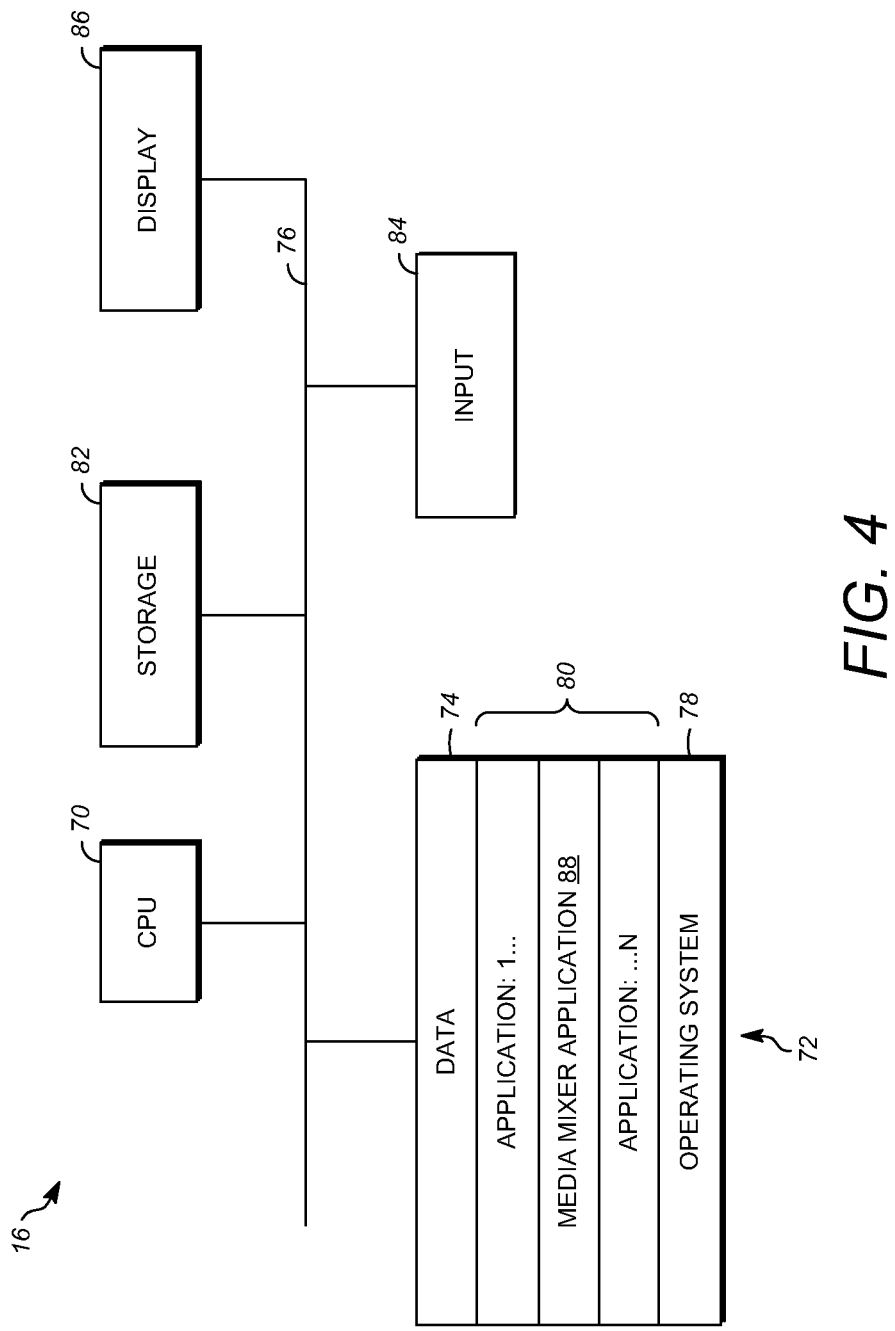
FIG. 4 is a block diagram showing an example of a server.

FIG. 4 is a block diagram of an example of a computing device that can be utilized as the server 16. The server 16 can be in the form of a computing system including multiple computing devices, or in the form of a single computing device. The server 16 can include a CPU 70, a memory 72, a bus 76, a storage device 82, one or more input devices 84, and a display device 86, all of which can be similar to equivalent parts of the client 10A, as discussed with reference to FIG. 2. The memory 72 can include code and data 74 as well as an operating system 78 and applications programs 80. The application programs 80 can include programs that permit the CPU 70 to perform the methods described here. For example, the application programs 80 can include applications 1 through N which further include a media mixer application 88, which will be described in detail herein.

Figure 5:
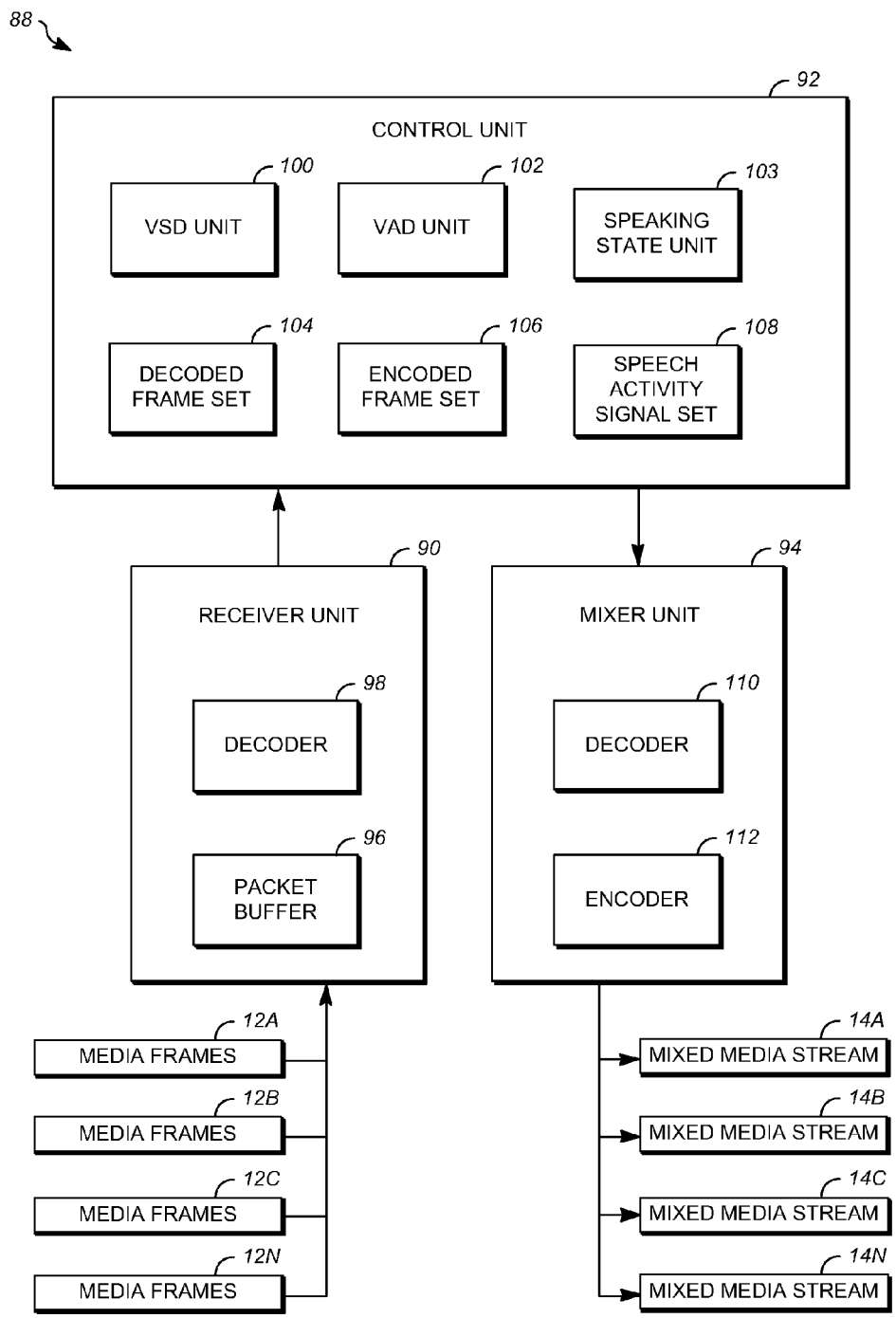
FIG. 5 is a block diagram showing an example of a media mixer application of the server.

FIG. 5 shows an example of the media mixer application 88. The media mixer application can accept the media frames 12A-12N as inputs, and can output the mixed media streams 14A-14B. The media mixer application 88 can include a receiver unit 90, a control unit 92, and a mixer unit 94.

The receiver unit 90 accepts the media frames 12A-12N as inputs. The receiver unit can include a packet buffer 96 and a decoder 98. As the media frames 12A-12N are received, they can be stored at the packet buffer 96. If the speech activity signal for any of the media frames 12A-12N cannot be extracted without first decoding the frame, for example, if the speech activity signal is not present in the extended RTP packet header, those media frames 12A-12N can be decoded at the decoder 98 of the receiver unit 90. Encoded media frames 12A-12N, decoded media frames 12A-12N, and speech activity signals can be produced as outputs and forwarded to the control unit 92.

The control unit 92 can include a VSD unit 100, a VAD unit 102, a speaking state unit 103, a decoded frame set 104, an encoded frame set 106, and a speech activity signal set 108. The decoded frame set 104 receives and stores the media frames 12A-12N that were decoded at the receiver unit 90. The encoded frame set 106 receives and stores the media frames 12A-12N that remain encoded. The speech activity signals that are received from the receiver unit 90 are added to the speech activity signal set.

The VSD unit 100, VAD unit 102, and the speaking state unit 103 are operable to output speech activity signals, including video-based speech activity signals, in the same manner as described with respect to the VSD unit 56, the VAD unit 58, and the speaking state unit 60 of the media processor application 50.

The control unit 92 is operable to determine, based on the speech activity signals that are stored in the speech activity signal set 108, which frames are to be mixed and incorporated in the mixed media streams 14A-14N. The media mixer application 88 can include a mixer unit 94 that receives the determination from the control unit 92 as to which of the media frames 12A-12N are to be mixed. The subset of media frames 12A-12N selected by the control unit 92 to be mixed are retrieved from the decoded frame set 104 and the encoded frame set 106, and, if not already decoded, are decoded at, for example, a decoder 110 of the mixer unit 94. The decoder 98 within the receiver unit 90 and the decoder 110 within the mixer unit 94 can be the same decoder. The mixer unit 94 is operable to apply a mixing algorithm to the media frames 12A-12N that were selected by the control unit 92 for mixing, such that the selected frames are represented in the mixed media streams 14A-14N. The mixer unit 94 can perform mixing according to any suitable algorithm. In one example, the video components of the selected frames are arranged in a side-by-side view. In another example, a grid view is defined.

Figure 6:
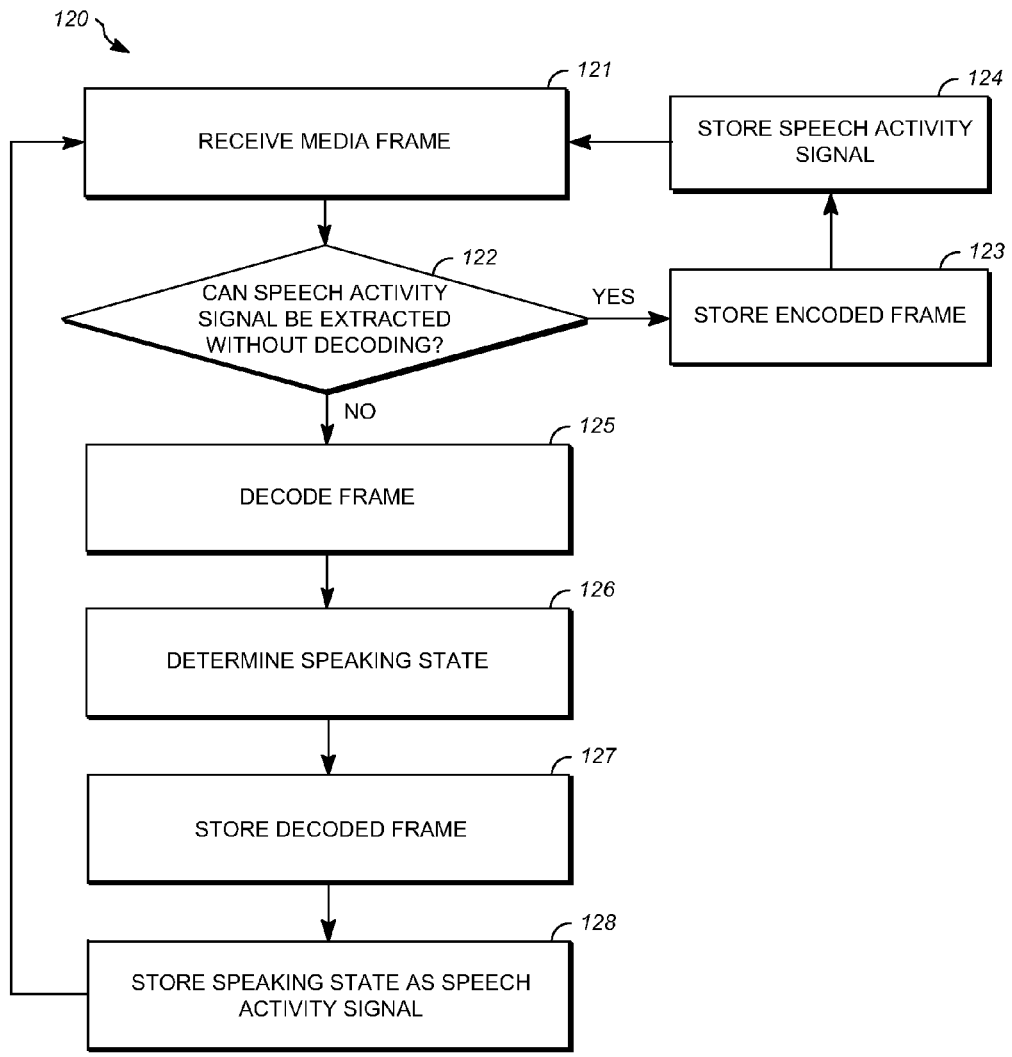
FIG. 6 is a flowchart showing an example of a process for receiving and storing a speech activity signal.

FIG. 6 is a flowchart showing an example of a process 120 for receiving and storing a speech activity signal.

At operation 121, one of the media frames 12A-12N is received from one of the clients 10A-10N. The media frame 12A-12N can be one of a plurality of media frames 12A-12N that are received during a time period in which a set of the media frames 12A-12N are gathered for mixing, which may also be referred to as a mix cycle or a mixing window. In some implementations, the media frame 12A-12N can be one or more RTP packets having a speech activity signal, such as a video-based speech activity signal, in its extended packet header, and a video component as its payload. Receiving the media frame 12A-12N can occur in any manner by which the media frame 12A-12N becomes available to the server 16. In some embodiments, the media frame 12A-12N is transmitted from one of the clients 10A-10N over a network and stored in the packet buffer 96.

At operation 122 a determination is made as to whether the speech activity signal for the media frame 12A-12N can be extracted without decoding the frame. In some implementations, this includes determining whether the speech activity signal is included in the extended RTP packet header for the RTP packets corresponding to the media frame 12A-12N. Other approaches can be used to render such a determination in addition to or instead of by way of examining a received packet for an extended header attribute. For example, the speech activity signal could be transmitted separately from the RTP packets. If the speech activity signal can be extracted without decoding the media frame 12A-12N, the process proceeds to operation 123. Otherwise, the process proceeds to operation 125.

At operation 123, the encoded media version of the media frame 12A-12N is stored. This can included storing the encoded version of the media frame 12A-12N at the encoded frame set 106 of the control unit 92. Because the speech activity signal was extracted from the encoded media frame 12A-12N, it need not be decoded at this time. At operation 124, the speech activity signal is extracted and stored, for example, at the speech activity signal set 108 of the control unit 92. The process then returns to operation 121 where another media frame 12A-12N can be received.

At operation 125, which is reached upon determining that the speech activity signal cannot be extracted from the encoded media frame 12A-12N, the media frame 12A-12N is decoded, for example, at the decoder 98 of the receiver unit 90. At operation 126, the decoded media frame 12A-12N is provided as an input to, for example, the VSD unit 100 and optionally to the VAD unit 100 as well, where a speaking state is determined for the media frame 12A-12N in the speaking state unit 103, in the manner previously discussed.

At operation 127, the decoded versions of the media frame 12A-12N is stored, for example, at the decoded frame set 104 of the control unit 92. At operation 128, the speaking state determined at operation 125 is used as a basis for the speech activity signal. For example, the speech activity signal can be set as positive in the speaking state unit 103 if the VSD unit 100 indicates that it is probable that the video component of the media frame 12A-12N includes a speaking participant. The process then returns to operation 121 where another media frame 12A-12N can be received.

Figure 7:
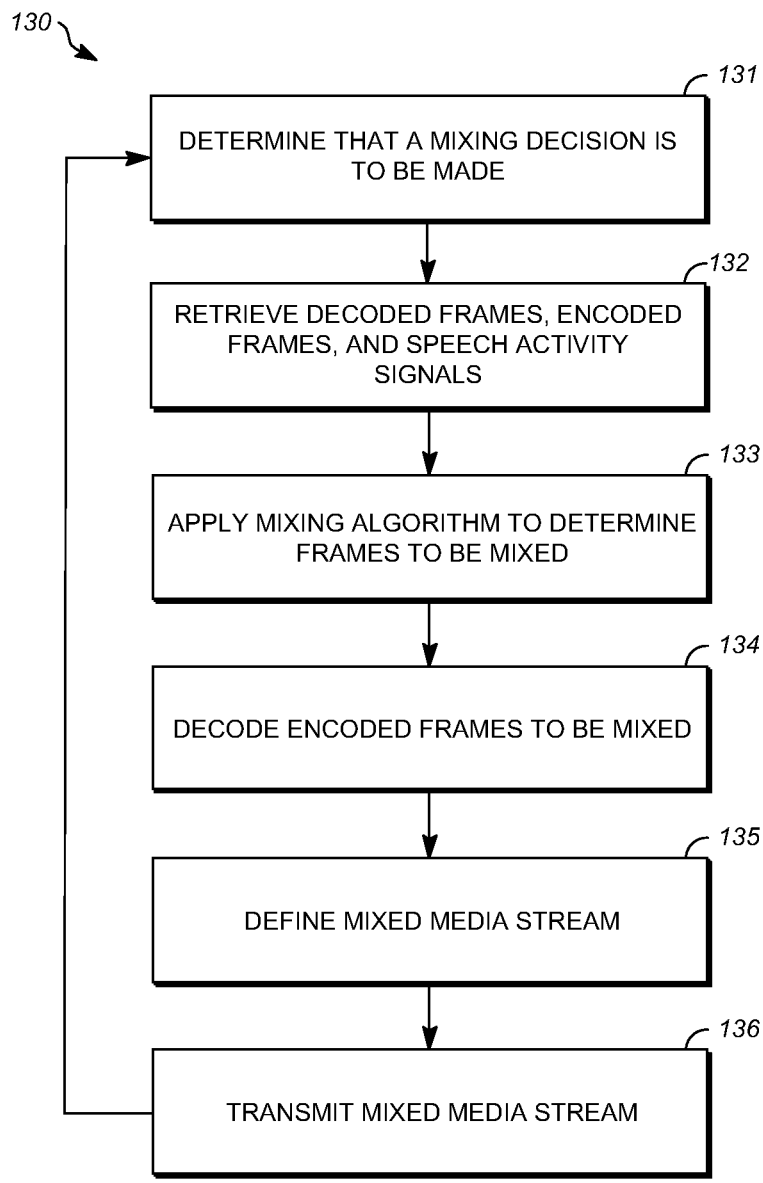
FIG. 7 is a flowchart showing an example of a process for defining a mixed media stream based on speech activity signals.

FIG. 7 is a flowchart showing an example of a process 130 for defining a mixed media stream based on speech activity signals.

The process 130 begins at operation 131 where it is determined that a mixing decision is to be made. For example, a determination that a mixing decision is to be made may occur following the receipt of one or more of the media frames 12A-12N at the receiver unit 90. As another example, a determination that a mixing decision is to be made can occur in response to the end of a mixing cycle.

At operation 132, decoded frames, encoded frames, and speech activity signals are retrieved. In some instances, only decoded frames or only encoded frames are retrieved. The speech activity signals that are retrieved can correspond to the retrieved frames. The decoded frames, encoded frames, and speech activity signals can, in some implementations, be retrieved from the decoded frame set 104, the encoded frame set 106, and the speech activity signal set 108.

At operation 133, a mixing algorithm is applied to the retrieved frames to determine which frames are to be mixed. The mixing algorithm can be applied to select at least some of the encoded media frames 12A-12N and/or the decoded media frames 12A-12N based on the speech activity signals retrieved at operation 132. In some implementations, the mixing algorithm is applied in order to determine which of the media frames 12A-12N from the decoded frame set 104 and the encoded frame set 106 are to be included in the mixing operation for the current mix cycle. In some implementations, the mixing decision could be to mix all, or a subset of all, of the media streams 12A-12N from the clients 10A-10N that have transmitted media streams for which a positive speech activity signal has been extracted or determined at the control unit 92. In another implementation, the speech activity signal can include a probability or magnitude value, and the mixing decision of operation 133 can at least partially depend on this probability or magnitude value. Selecting the highest probabilities or magnitudes can allow for selection of a set number of media frames to be mixed when the number of positive speech activity signals exceeds the maximum number of signals to be mixed. A variety of other mixing algorithms can also be applied at operation 133 of the process 130 in addition to or instead of the example algorithms described above.

At operation 134 the encoded media frames that have been selected for mixing can be decoded. In some implementations, these are media frames 12A-12N from the encoded frame set 106. This decoding can occur, for example, at the decoder 110 of the mixer unit 94 or at any other suitable decoder. The newly decoded frames are added to the previously decoded frames that were selected for mixing, and all of the selected frames can be provided, in some implementations, to the mixer unit 94 for mixing.

At operation 135, the selected frames that were identified at operation 133 are combined to define one or more mixed media streams, such as the mixed media streams 14A-14N, each of which can be a single video feed that incorporates representations of multiple ones of the media frames 12A-12N. A single video feed of this type can be defined, for example, by compositing multiple video frames into a single video frame. The audio components of the selected ones of the media frames 12A-12N can also be combined. This can be performed, for example, by the mixer unit 94 using the encoder 112 or by any other encoder available for the process 130. At operation 136, the mixed media streams 12A-12N are transmitted to the clients 10A-10N.

In an alternative implementation, the mixed media streams 14A-14N include the individual media frames 12A-12N that were selected for mixing, without combining multiple media frames 12A-12N into a single video frame. In this implementation, decoding at operation 134 can be omitted by transmitting the selected media frames from the server 16 to the clients 10A-10N without first decoding the selected media frames at the one or more computers, and instead sending the individual encoded versions of the selected media frames as stored in the encoded frame set 106 instead.

As used herein, the term "computer" means any device of any kind that is capable of processing a signal or other information. Examples of computers include, without limitation, an application-specific integrated circuit (ASIC) a programmable logic array (PLA), a microcontroller, a digital logic controller, a digital signal processor (DSP), a desktop computer, a laptop computer, a tablet computer, and a mobile device such as a mobile telephone. A computer does not necessarily include memory or a processor. A computer can include software in the form of programmable code, micro code, and or firmware or other hardware embedded logic. A computer can include multiple processors which operate in parallel. The processing performed by a computer can be distributed among multiple separate devices, and the term computer encompasses all such devices when configured to perform in accordance with the disclosed embodiments.

Each of the clients 10A-10N, the server 16, and all other computer-based systems described herein can be implemented in the form of multiple computers, processors, or other systems working in concert. As an example, the functions performed by the server 16 can be distributed among a plurality of computers, each of which is capable of performing some or all of the functions that are described with respect to the server 16.

Further, all or a portion of the implementations of the present disclosure can take the form of a computer program product accessible from, for example, a non-transitory computer-usable or computer-readable medium. The non-transitory computer-usable or computer-readable medium can be any tangible device that can, for example, contain, store, communicate, or transport the program for use by or in connection with any processor. The non-transitory computer-usable or computer-readable medium can be, for example, any type of disk including floppy disks, optical disks, CD-ROMs, magnetic or optical cards, application specific integrated circuits (ASICs), or any type of non-transitory media suitable for storing electronic instructions, and each coupled to a computer system bus. For example, either or both of the process 120 or the process 130 can be embodied as computer executable instructions that are stored, for example, at the memory 72 of the server 16, and can be executed at the CPU 70 to cause execution of any or all of the previously discussed operations.

It is to be understood that the disclosure is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for video conferencing, comprising:
receiving, at one or more computers from at least some remote clients from a plurality of remote clients, information representing a plurality of encoded media frames;
receiving, at the one or more computers from at least some of the plurality of remote clients, a plurality of video-based speech activity signals each associated with a respective media frame from the plurality of encoded media frames, wherein each video-based speech activity signal is a value indicative of whether the respective media frame is associated with a participant who is currently speaking;
selecting, at the one or more computers, at least some media frames from the plurality of encoded media frames based on the video-based speech activity signals;
decoding the selected media frames;
generating a mixed media stream by combining the decoded media frames; and
transmitting, from the one or more computers to at least some remote clients from the plurality of remote clients, the mixed media stream.

2. The method for video conferencing of claim 1, wherein the information representing the plurality of encoded media frames includes video packets.

3. The method for video conferencing of claim 2, wherein the video packets are Real-Time Transport Protocol (RTP) packets.

4. The method for video conferencing of claim 2, wherein the video-based speech activity signals are each included in an extended packet header of one or more of the video packets.

5. The method for video conferencing of claim 1, wherein the video-based speech activity signals are generated at respective ones of the remote clients based at least in part on a video component of the respective encoded media frame.

6. The method for video conferencing of claim 1, wherein the video-based speech activity signals are generated at respective ones of the remote clients based at least in part on a video component of the respective encoded media frame using lip motion analysis.

7. The method for video conferencing of claim 1, wherein the video-based speech activity signals are generated at respective ones of the remote clients based at least in part on a video component of the respective encoded media frame based on hand motion.

8. The method for video conferencing of claim 1, wherein the video-based speech activity signals are generated at respective ones of the remote clients based at least in part on a video component of the respective media frame using lip motion analysis and based at least in part on an audio component of the respective encoded media frame using voice activity detection.

9. The method for video conferencing of claim 1, wherein the value is at least one of a probability, a numeric value, or a Boolean value.

10. A method for video conferencing, comprising:
receiving, at one or more computers from at least some remote clients from a plurality of remote clients, information representing a plurality of encoded media frames;
receiving, at the one or more computers from at least some of the plurality of remote clients, a plurality of video-based speech activity signals each associated with a respective media frame from the plurality of encoded media frames, wherein each video-based speech activity signal is a value indicative of whether the respective media frame is associated with a participant who is currently speaking;
selecting, at the one or more computers, at least some media frames from the plurality of encoded media frames based on the video-based speech activity signals; and
transmitting, from the one or more computers to at least some remote clients from the plurality of remote clients, the selected media frames without decoding the selected media frames at the one or more computers.

11. The method for video conferencing of claim 10, wherein the information representing the plurality of encoded media frames includes video packets.

12. The method for video conferencing of claim 11, wherein the video packets are Real-Time Transport Protocol (RTP) packets.

13. The method for video conferencing of claim 11, wherein the video-based speech activity signals are each included in an extended packet header of one or more of the video packets.

14. The method for video conferencing of claim 10, wherein the video-based speech activity signals are generated at respective ones of the remote clients based at least in part on a video component of the respective encoded media frame.

15. The method for video conferencing of claim 10, wherein the video-based speech activity signals are generated at respective ones of the remote clients based at least in part on a video component of the respective encoded media frame using lip motion analysis.

16. The method for video conferencing of claim 10, wherein the video-based speech activity signals are generated at respective ones of the remote clients based at least in part on a video component of the respective encoded media frame based on hand motion.

17. The method for video conferencing of claim 10, wherein the video-based speech activity signals are generated at respective ones of the remote clients based at least in part on a video component of the respective encoded media frame using lip motion analysis and based at least in part on an audio component of the respective encoded media frame using voice activity detection.

18. The method for video conferencing of claim 10, wherein the value is at least one of a probability, a numeric value, or a Boolean value.

19. A video conferencing apparatus, comprising:
one or more computers configured to:
receive, from at least some remote clients from a plurality of remote clients, information representing a plurality of encoded media frames;
receive, from at least some of the plurality of remote clients, a plurality of video-based speech activity signals each associated with a respective encoded media frame from the plurality of media frames, wherein each video-based speech activity signal is a value indicative of whether the respective encoded media frame is associated with a participant who is currently speaking;
select, at the one or more computers, at least some media frames from the plurality of media frames based on the video-based speech activity signals;
decode the selected media frames;
generate a mixed media stream by combining the decoded media frames; and
transmit, from the one or more computers to at least some remote clients from the plurality of remote clients, the mixed media stream.

20. The video conferencing apparatus of claim 19, wherein the information representing the plurality of media frames includes Real-Time Transport Protocol (RTP) video packets, and the video-based speech activity signals are each included in an extended packet header of one or more of the RTP video packets.

21. The video conferencing apparatus of claim 19, wherein the video-based speech activity signals are generated at respective ones of the remote clients based at least in part on a video component of the respective encoded media frame.

22. The video conferencing apparatus of claim 19, wherein the value is at least one of a probability, a numeric value, or a Boolean value.

23. A non-transitory computer readable medium including program instructions executable by one or more processors that, when executed, cause the one or more processors to perform operations, the operations comprising:
receiving, at one or more computers from at least some remote clients from a plurality of remote clients, information representing a plurality of encoded media frames;
receiving, at the one or more computers from at least some of the plurality of remote clients, a plurality of video-based speech activity signals each associated with a respective encoded media frame from the plurality of media frames, wherein each video-based speech activity signal is a value indicative of whether the respective encoded media frame is associated with a participant who is currently speaking;
selecting, at the one or more computers, at least some media frames from the plurality of media frames based on the video-based speech activity signals;
decoding the selected media frames;
generating a mixed media stream by combining the decoded media frames; and
transmitting, from the one or more computers to at least some remote clients from the plurality of remote clients, the mixed media stream.

24. The non-transitory computer readable medium of claim 23, wherein the information representing the plurality of media frames includes Real-Time Transport Protocol (RTP) video packets, and the video-based speech activity signals are each included in an extended packet header of one or more of the RTP video packets.

25. The non-transitory computer readable medium of claim 23, wherein the video-based speech activity signals are generated at respective ones of the remote clients based at least in part on a video component of the respective encoded media frame.

26. The non-transitory computer readable medium of claim 23, wherein the value is at least one of a probability, a numeric value, or a Boolean value.

* * * * *